(No Model.)
L. SMITH.
APPARATUS FOR STORING AND PRESERVING FOOD.
No. 446,024. Patented Feb. 10, 1891.
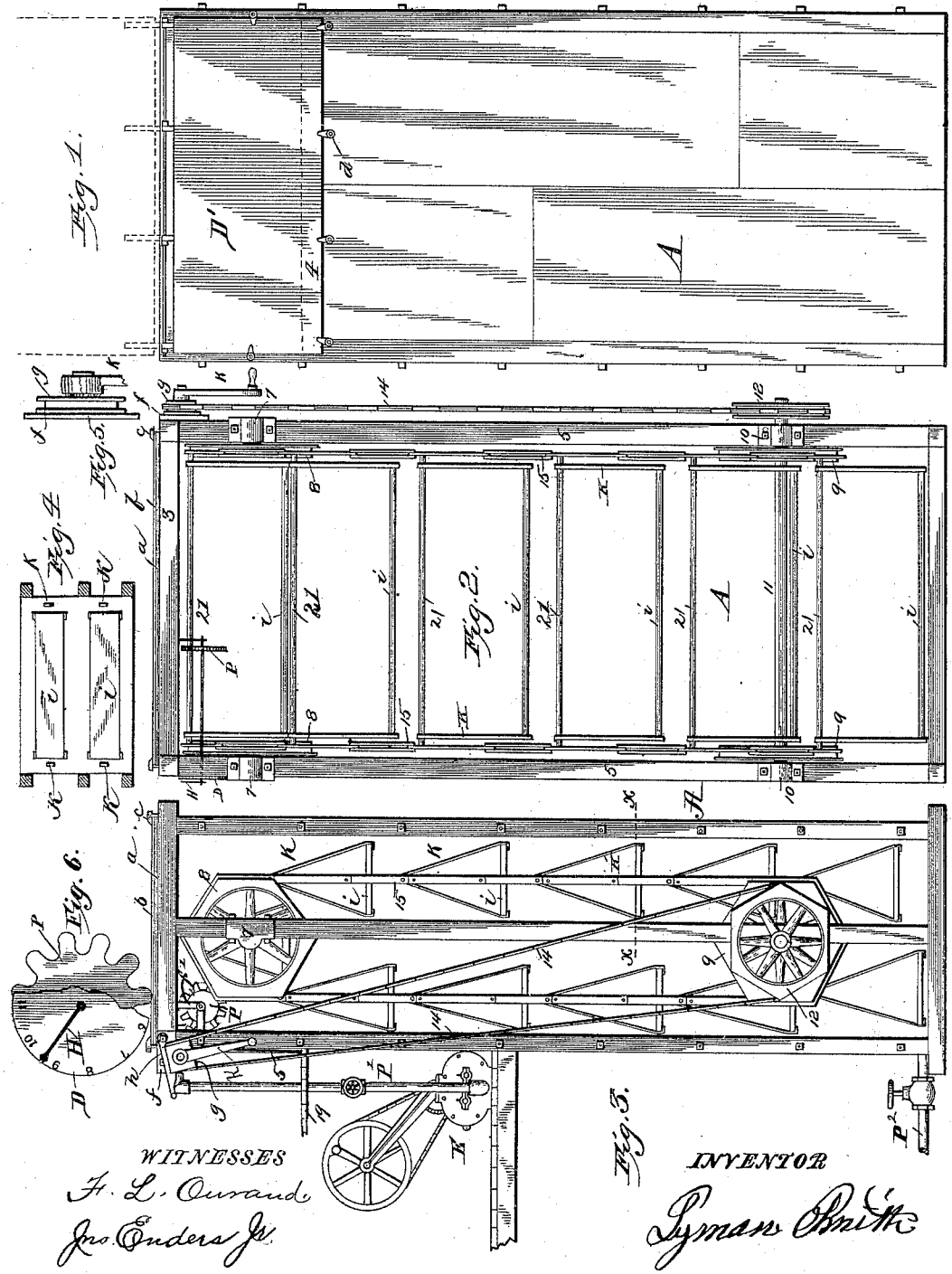
WITNESSES
F. L. Ourand
Jno. Enders Jr.
INVENTOR
Lyman Smith

UNITED STATES PATENT OFFICE.

LYMAN SMITH, OF CHICAGO, ILLINOIS, ASSIGNOR TO THE SMITH PNEUMATIC TRANSFER AND STORAGE COMPANY, OF WEST VIRGINIA.

APPARATUS FOR STORING AND PRESERVING FOOD.

SPECIFICATION forming part of Letters Patent No. 446,024, dated February 10, 1891.

Application filed May 3, 1890. Serial No. 350,492. (No model.)

*To all whom it may concern:*

Be it known that I, LYMAN SMITH, a citizen of the United States, residing at Chicago, in the county of Cook and State of Illinois, have invented certain new and useful Improvements in Apparatus for Storing and Preserving Food Products; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Referring to the drawings, Figure 1 is a front elevation showing the door shut. Fig. 2 is a like view with the outer wall removed, illustrating the arrangement of hanging movable shelves. Fig. 3 is an end elevation, the outer wall being also removed. Fig. 4 is a cross-section taken on the line $x$ $x$ of Fig. 3. Fig. 5 is an enlarged edge view of the square pinion. Fig. 6 is a detail view of the indicator.

The invention relates to the storage and preservation of food products of a readily-perishable nature, such as fruits and vegetables, flesh, fish, and fowl; and it has for its object to take the place of the ordinary and expensive cold storage for the preservation of such products.

It is a well-established fact that the preservation of perishable food, whatever may be the process of preservation resorted to, unless it is absolute desiccation, depends chiefly upon the exclusion therefrom of atmospheric air, and that when this can be effected a comparatively small amount of a suitable preservative agent will be all that is necessary to preserve such food for almost an indefinite period of time.

In contradistinction to cold, heat has heretofore been used almost exclusively in the processes of preservation to effect the destruction of the germs of animalculæ or insect life, the partly-cooked substances being stored in vessels from which the air has been exhausted. Such products, known as "canned goods," undergo, however, a change, in that their flavor is either entirely destroyed or sufficiently altered to render them more or less unpalatable. The cold-storage system also has its disadvantages irrespective of the expense connected therewith, in that the texture of the food preserved is often very materially changed and the flavor impaired. On the other hand, food products stored under such low temperatures as will insure their preservation cannot be shipped or kept for any length of time after removal from the cold storage, such products, as a rule, perishing very rapidly.

It is also well known that carbonic-acid gas when used in proper volumes has little or no effect upon articles of food, and does not alter ther flavor or impart to them an unpalatable taste to any great extent.

This invention is designed to substitute for the cold storage and for the canning process a means of preservation in which either total absence of air or absence of air and substitution of carbonic-acid gas is resorted to as the means of preservation, the articles of food being stored in an air-tight receptacle, from which the air can be exhausted, means being provided for admitting carbonic-acid gas to take the place of the air after it is exhausted or while it is being exhausted.

To these ends the invention consists in the construction of the storage-chamber, in the means for supporting the articles of food therein, and in combinations of parts and construction of details, as will now be fully described, reference being had to the accompanying drawings.

The storage-chamber consists of a box A, of suitable dimensions and adapted to be rendered perfectly air-tight. The top $b$ of the box A is preferably removable, so that access to the interior may be had for purposes of cleaning, and to make an air-tight joint between the box and its top I form a groove in the upper face of the framing, into which is laid rubber tubing, so as to form a compressible gasket $a$, the top $b$ being secured by latches or clamps $c$, as shown in Figs. 2 and 3. The box itself is preferably constructed of sheet metal supported from two frames consisting of three vertical studs and two horizontal braces secured to the box A at opposite ends, said frames being connected at top by two cross-timbers, a door-frame being formed at one end of the frame by an additional cross-timber 4, (shown in dotted lines in Fig. 1,) to which a door is preferably so hinged as to swing upward, an air-tight joint being formed by means substantially such as described in reference to the top $b$ or in any other suitable manner.

Near the bottom of the tank is arranged a cross-shaft 11, that revolves in suitable bearings 10, said shaft projecting outside of the box A and carrying three hexagonal chain-pulleys, of which two (marked $q$) are arranged within the box and the other (marked 12) on the outside thereof. Near the upper end of the box are arranged two short shafts that revolve in suitable bearings 7, each of which carries a hexagonal chain-pulley 8, similar to those on shaft 11, inside the box. These chain-pulleys are connected in pairs on opposite sides of the box by chains 15, composed of double and single bar links pivotally connected. In the single-bar links are pivoted cross shafts or rods 21, from which are suspended shelves $i$, by means of bails K, (see Fig. 3,) so that when the chain-pulleys are revolved the shelves are displaced vertically, as will be readily understood.

The outside chain-pulley 12 is connected by means of a chain 14 with a square pinion $g$, the operative faces of which are equal in length to one-half of the operative faces of pulley 12, the length of the links of chain 14 being equal to that of one of the operative faces of pinion $g$. The shaft of pinion $g$ carries a crank $k$ for revolving the same, said shaft being mounted in a suitable angle-bracket $f$, secured to the box-framing. In a similar bracket $f'$, within the box A and in a suitable bearing formed in or connected with said box A, is mounted a shaft, the outer end of which carries a hand H, Fig. 6, that travels over a suitably-graduated index or dial D, having as many subdivisions as there are hanging shelves $i$, ten being shown in the drawings, so that the dial will have ten subdivisions.

Upon the index or hand-shaft is mounted a pinion P, that has a number of teeth equal to the number of shelves, and is so located relatively to the cross-shafts 21 as that said cross-shafts as they move by will engage the teeth of pinion P and revolve the same a distance of one tooth, or a distance equal to that between two subdivisions on the dial D and corresponding to the distance traveled by each shelf from a given point to a given point, so that it may be ascertained which one of the shelves is at the door D' without opening the same. Certain articles of food on any one of the shelves may thus be brought to the door D' for removal before opening the said door, an advantage that is obvious.

An exhaust apparatus E, driven from any suitable motor, is connected by a valved pipe P' with the box A, near its top, and $P^2$ is a valved pipe connected with the box near its bottom, the said pipe $P^2$ serving to admit carbonic-acid gas to the box.

In the drawings the box A is supposed to be of such length as that its upper portion is accessible, for instance, from a store or kitchen, the box being set in a basement or cellar, in which is also located the exhaust-blower. In Fig. 3, 19 is supposed to indicate a portion of the floor of such store or kitchen, so that the articles may be moved off the shelves onto the floor 19.

The operation of my improved storage box or chamber may be briefly described as follows, the supposition being that the shelves are empty. The door D' being swung up and held in an open position by any suitable means, the shaft of pinion $g$ is rotated (the pawl $h$ having first been disengaged from said pinion) to bring a shelf on a level with the floor. The pawl $h$ is now thrown into engagement with the pinion, the shelf is loaded and a note taken of the substances placed thereon, the index indicating the number of the shelf. The pawl is again disengaged from the pinion $g$, the shaft thereof revolved to carry the loaded shelf to the back of the box opposite the door D', and another shelf brought to the door is loaded and a note taken of its contents. The load of the shelf in front will to a greater or less extent counterbalance that on the shelf first loaded, thus establishing an equilibrium or approximate equilibrium between the two shelves to reduce the power required to revolve the shaft, and so on until all the shelves are loaded, when the shaft of pinion $g$ is locked against rotation by means of the pawl $h$. The door D' is now closed and the exhaust apparatus set in motion to exhaust the air from the box A, and simultaneously therewith or after the air has been exhausted carbonic-acid gas is admitted to take the place of the air.

The object of locating the door D' at the top of the box is to avoid too great a loss of carbonic-acid gas, which would be the case were the door located at the foot of the box, or thereabout, as it is well known that carbonic-acid gas is heavier than atmospheric air, so that if the door were at the bottom and opened the air would rush in and drive out the greater portion of the carbonic-acid gas. When, however, the door is located at the upper end of the box and is opened, the small amount of air entering the box will simply cause the heavier gas to sink toward the bottom. With a preponderating volume of carbonic-acid gas in the box A there will be no danger of the contents spoiling, for the reason that whenever the shelves are set in motion they will pass through the denser carbonic-acid gas, which will thus more effectually act as a preservative agent for those substances which may have remained for some time in the upper part of the box.

Having described my invention, what I claim, and desire to secure by Letters Patent, is—

1. As a means for storing and preserving food products, a tank or box adapted to be hermetically closed, shelves for said box, and endless chains from which said shelves are suspended, suitable chain-pulleys adapted to be revolved, and a rotary exhauster for exhausting the air from and a pipe admitting carbonic-acid gas to the bottom of said box, as and for the purposes specified.

2. As a means for storing and preserving food products, a tank or box adapted to be hermetically closed, shelves for said box, and endless chains from which said shelves are suspended, suitable chain-pulleys adapted to be revolved, a lock adapted to lock the pulleys against revolution, and means, substantially such as described, for exhausting the air from and admitting carbonic-acid gas to said box, as and for the purposes specified.

3. As a means for storing and preserving food products, a tank or box adapted to be hermetically closed, shelves for said box, endless chains from which the said shelves are suspended, suitable chain-pulleys adapted to be revolved, in combination with an air-exhauster connected with the box at top, and a carbonic-acid-gas duct connected with said box at bottom, substantially as and for the purposes specified.

4. As a means for storing and preserving food products, a tank or box adapted to be hermetically closed and provided with a door for gaining access thereto, shelves for said box, endless chains from which said shelves are suspended, an indicator controlled by the movements of the shelves and adapted to indicate the position thereof relatively to the door, a lock for locking the chain-pulleys against revolution, and means, substantially such as described, for exhausting the air from and admitting carbonic-acid gas to said box, as and for the purposes specified.

5. As a means for storing and preserving food products, a polygonal tank or box adapted to be hermetically closed, a door located at the upper end thereof, revoluble chain-pulleys arranged within the box at top and bottom, endless chains passing over said pulleys, cross rods or shafts connected with the chains, shelves suspended from said shafts, an index-wheel adapted to be revolved by the cross-shafts, an index hand or pointer on the shaft of the index-wheel, and a graduated dial on the outside of the box, on which and over which the index is adapted to revolve, and means, substantially such as described, for exhausting the air from and admitting carbonic-acid gas to the box, as and for the purposes specified.

6. The combination, with the polygonal box A, provided with a door at its upper end, chain-pulleys arranged within the box at top and bottom, endless chains passing over said pulleys, cross-shafts connected with said chains, shelves suspended from the cross-shafts, a chain-pulley outside of the box on the lower pulley-shaft, a square pinion at the upper end of the box, an endless chain connecting the square pinion with the outer chain-pulley, and means for revolving the said pinion, of a pinion P, adapted to be revolved by the cross-shafts of the shelves, an index on the shaft of the pinion P, and a graduated dial over which said index is adapted to travel, said index and dial being arranged on the outside of the box at the upper end thereof, substantially as and for the purposes specified.

In testimony whereof I affix my signature in presence of two witnesses.

LYMAN SMITH.

Witnesses:
L. LA RUE SMITH,
U. G. M. PERRIN.